United States Patent [19]

Inagaki et al.

[11] Patent Number: 4,729,459
[45] Date of Patent: Mar. 8, 1988

[54] ADJUSTABLE DAMPING FORCE TYPE SHOCK ABSORBER

[75] Inventors: Mitsuo Inagaki; Hideaki Sasaya, both of Okazaki; Kenji Takeda, Aichi; Hiromichi Nakano, Okazaki; Sigeru Kamiya, Aichi; Toshinobu Ishida, Okazaki, all of Japan

[73] Assignee: Nippon Soken, Inc., Nishio, Japan

[21] Appl. No.: 781,638

[22] Filed: Sep. 30, 1985

[30] Foreign Application Priority Data

Oct. 1, 1984 [JP] Japan .................................. 59-206699
Jul. 30, 1985 [JP] Japan .................................. 60-166669

[51] Int. Cl.[4] ............................................. B60G 17/06
[52] U.S. Cl. .................................. 188/299; 188/1.11; 188/267; 188/285; 188/319; 280/703; 310/325
[58] Field of Search ....................... 188/1.11, 299, 267, 188/285, 319; 280/707, 703; 310/325

[56] References Cited

U.S. PATENT DOCUMENTS

| | | | |
|---|---|---|---|
| 2,443,471 | 6/1948 | Mason | 188/267 |
| 3,321,210 | 5/1967 | Delcher | 280/6 |
| 3,501,099 | 3/1970 | Benson | 310/328 X |
| 4,351,515 | 9/1982 | Yoshida | 188/267 |
| 4,471,256 | 9/1984 | Igashira et al. | 310/328 |
| 4,527,676 | 7/1985 | Emura et al. | 188/299 |
| 4,629,039 | 12/1986 | Imoto et al. | 310/328 X |

FOREIGN PATENT DOCUMENTS

| | | | |
|---|---|---|---|
| 3312881 | 11/1984 | Fed. Rep. of Germany | 188/299 |
| 58-194609 | 11/1983 | Japan . | |
| 194609 | 11/1983 | Japan . | |
| 60-23334 | 2/1985 | Japan . | |

Primary Examiner—George E. A. Halvosa
Assistant Examiner—Matthew C. Graham
Attorney, Agent, or Firm—Cushman, Darby & Cushman

[57] ABSTRACT

An adjustable damping force type shock absorber having a function to detect a damping force generated thereon and a function to adjust the damping force thereof.

17 Claims, 13 Drawing Figures

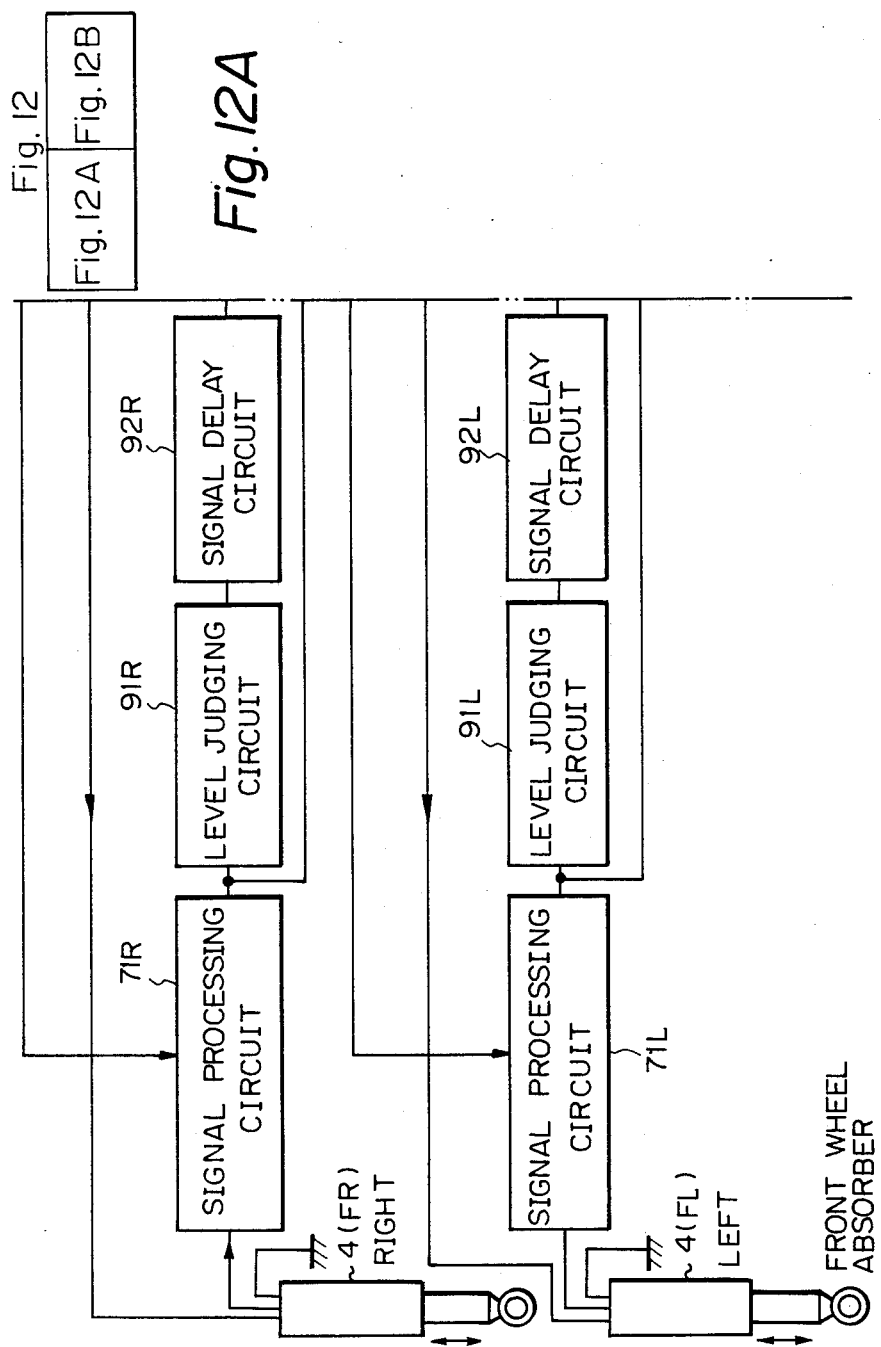

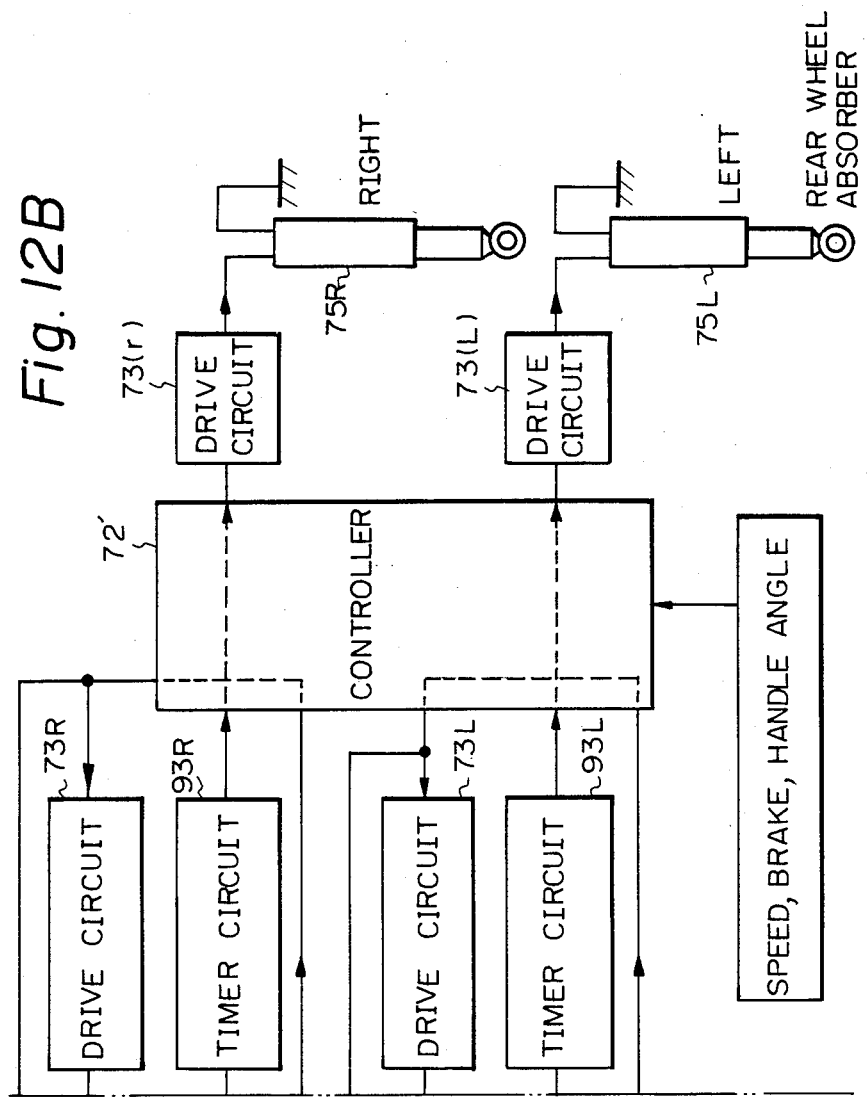

ADJUSTABLE DAMPING FORCE TYPE SHOCK ABSORBER

BACKGROUND OF THE INVENTION

1. Field of the Invention

The present invention relates to a variable damping force type shock absorber able to detect and adjust a damping force generated therein, and a control system for controlling the shock absorber.

2. Description of the Related Art

Preferably, the damping force of a shock absorber is changed according to the state of the road or motion (running state) of the automobile to give a comfortable ride to passengers, etc., in the vehicle. Japanese Unexamined Patent Publication (Kokai) No. 58-194609 discloses a shock absorber capable of changing the magnitude of the damping force. This shock absorber comprises a cylinder, a piston inserted in the cylinder to separate an inner space of the cylinder into two oil chambers communicated by a orifice formed in the piston, and a rotary valve for regulating the magnitude of the cross-sectional area of the orifice, and is capable of regulating the magnitude of the damping force by changing the cross-sectional area by means of the rotary valve.

In the prior art system for regulating the damping force of the shock absorber in accordance with the state of the road or motion of the vehicle, a plurality of sensors are installed in the car; such as a sensor for detecting the rotation angle of the steering wheel, a throttle sensor, a brake sensor, or an ultrasonic sensor for detecting the roughness of the road are used to detect or forecast the state of the road or the motion of the vehicle indirectly, and the damping force regulation is carried out according to the result of the forecast.

This prior art system has several disadvantages, in that the cost of system is increased because of the various types of sensor required, the constitution of a circuit for forecasting the motion of the vehicle on the basis of the detection signals received from a plurality of the sensors becomes intricate, and the sensitivity of the detection of the state of the road by the ultra-sonic sensor, etc., is limited due to mud-splashing, etc.

To solve the above described problems, a method has been disclosed wherein the road state and the motion of the vehicle are detected on the basis of the movements of four shock absorbers installed at the front and rear wheels respectively. This method distinguishes each of the above states on the basis of the characteristic movements shown by the four shock absorbers, as described below, in accordance witn the state of the road or the motion of the vehicle.

Namely, in the "squat" phenomenon caused by rapid acceleration from a standstill, the two shock absorbers at the front wheels expand and the two shock absorbers at the rear wheels contract. In the "nose-dive" phenomenon caused by a sudden braking action, the two shock absorbers at the front wheels contract and the two shock absorbers at the rear wheels expand. Further, in the "rolling" phenomenon caused by a sharp or sudden turn to the right or left, the shock absorbers on one side expand and the shock absorbers on the other side contract. When the vehicle is running on a rough road surface, each of the four shock absorber expands and contracts at random. Therefore, by detecting the expansion and the contraction of the four shock absorbers and the mutual relationship therebetween, it is possible to detect the motion of the vehicle and the state of the road. Further, on the basis of this information, it is possible to regulate the damping force of the four shock absorbers individually, to bring about an optimum running state in accordance with the state of the road and the motion of the vehicle.

In the control of the damping force, for example, in order to control the damping force in accordance with the results of detection of the phenomena such as "squat", "nose-diving", or "rolling", it is necessary to detect these phenomena at an early stage to properly control the damping force, otherwise a sufficient effect cannot be attained. A method for detecting the expansion and contraction of the shock absorber has been proposed, in which the expansion and contraction length of the shock absorber is directly measured by means of an expansion and contraction sensor. Japanese Unexamined Utility Model Publication (Kokai) No. 60-23334 discloses such an expansion and contraction sensor.

However, if this prior art sensor is used to detect the phenomena such as "squat", "nose-diving", and "rolling", the decision of whether or not that phenomenon is severe enough to necessitate a damping force control or is so insignificant that the damping control is not needed cannot be made until the phenomenon is in progress. Accordingly, it is difficult to execute an effective damping force control by means of the prior art expansion and contraction sensor.

To solve this problem, a method has been proposed that is based on the rapidity of the expansion and contraction. In this method, the differential coefficient with respect to the time of the expansion and contraction of the shock absorber is calculated to obtain the speed of the expansion and contraction, and it is decided at an early stage whether or not the phenomenon is severe. However, in this method, a process for differentiating the output of the expansion and contraction sensor with respect to the time is necessary, and accordingly, a processing circuit must be included to accomplish this differentiation. Further, the expansion and contraction sensor that must be adopted in this method is very intricate.

SUMMARY OF THE INVENTION

It is an object of the present invention to provide an improved adjustable damping force type shock absorber having a sensor for sensing the magnitude of the generated damping force, and a mechanism for adjusting the damping force, and a control apparatus for the shock absorber.

According to a fundamental aspect of the present invention, there is provided an adjustable damping force type shock absorber wherein a first and a second oil chambers are formed by inserting a piston in a cylinder in a slidable manner, the shock absorber comprising: a communicating path formed in the piston for communicating between the first and the second oil chambers; a sliding member capable of changing the passage area of the communicating path by a sliding displacement of the member, one end surface of the member being capable of receiving the pressure of the second oil chamber; and a piezo-electric body arranged at the other end surface of the sliding member, receiving the displacement of the sliding member as a stress and generating a voltage according to the stress, causing displacement of the expansion and contraction according to an applied voltage, and transmitting this displacement to the sliding member.

According to another aspect of the present invention, there is provided an adjustable damping force type shock absorber comprising: a cylinder; a piston slidably inserted in the cylinder so that an inner space of the cylinder is substantially separated into two chambers, and having a communicating path for communication between the chambers; a sliding member arranged in the piston in a slidable manner so that an area of the communicating path of the piston can be adjusted; and a piezo-electric body arranged at the piston and capable of moving the sliding member according to the expansion and contraction of the piezo-electric body to thereby adjust the area of the communicating path on the basis of reverse piezo-electric effect, and being arranged so that the pressure of one of the chambers is exerted on the body and thereby a detection voltage is generated on the basis of a piezo-electric effect.

According to a further aspect of the present invention, there is provided an adjustable damping force type shock absorber comprising: a cylinder; a piston slidably inserted in the cylinder so that an inner space of the cylinder is substantially separated into two chambers, and having a communicating path for communication between the chambers; a mechanism for adjusting the damping force by changing a cross sectional area of the communicating path; and a damping force sensor for detecting the damping force generated according to the expansion and contraction of the shock absorber and converting that damping force into an electrical signal.

BRIEF DESCRIPTION OF THE DRAWINGS

Embodiments of an adjustable damping force type shock absorber and a control apparatus for the shock absorber in accordance with the present invention will now be described with reference to the accompanying drawings, in which:

FIGS. 12A and 12B show a further embodiment of the control apparatus according to the present invention.

DESCRIPTION OF THE PREFERRED EMBODIMENTS

Figure 1:
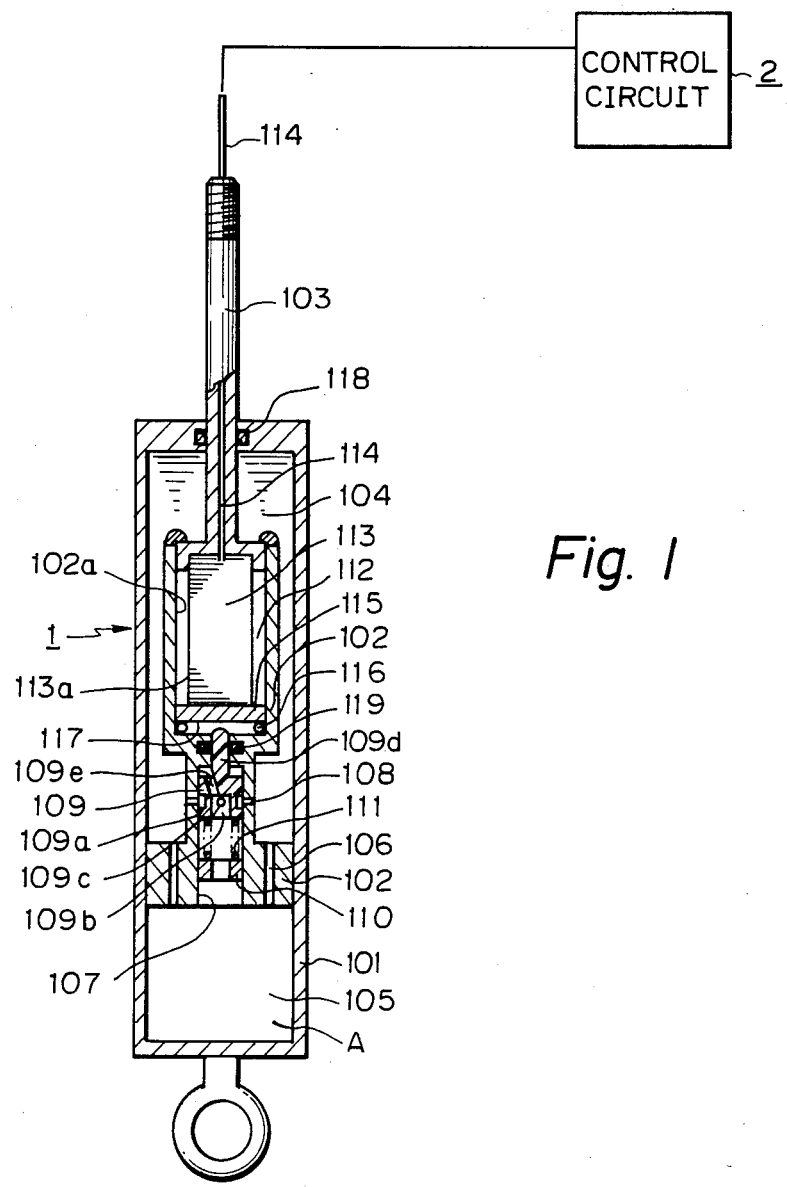
FIG. 1 shows a cross sectional view of a first embodiment of the adjustable damping force type shock absorber according to the present invention.
Figure 2:
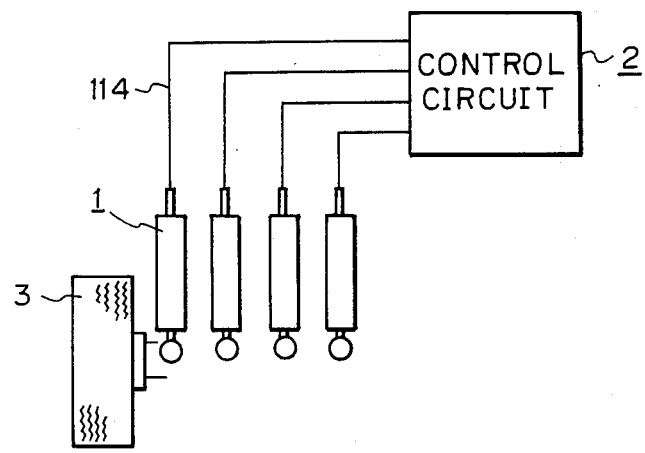
FIG. 2 is a schematic representation of the control apparatus for the shock absorber of FIG. 1.
Figure 3:
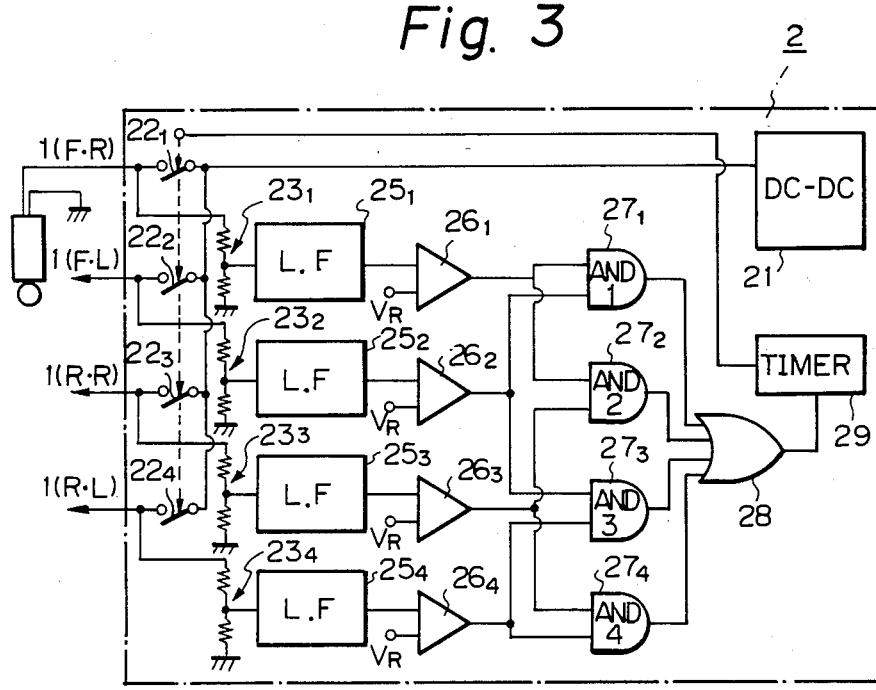
FIG. 3 is a circuit diagram of the control circuit of FIG. 2, in more detail.

A preferred embodiment of the present invention will now be explained with reference to FIGS. 1 to 3. FIG. 1 shows a sectional view of the adjustable damping force type shock absorber as a first embodiment of the present invention, FIG. 2 is a schematic representation of a controlling apparatus for the shock absorber shown in FIG. 1, and FIG. 3 is a circuit diagram of the control circuit illustrated in FIGS. 1 and 2, in more detail.

In FIG. 1, the shock absorber 1 comprises a cylinder 101, a piston 102 slidably inserted in the cylinder 101, and a piston rod 103 welded to the piston 102. The piston 102 separates the inner space of the cylinder 101 into first and second oil chambers 104 and 105 filled with the working fluid or oil and a very small amount of a gas such as air or nitrogen, and has a restrictor 106, i.e., an orifice, for communicating between the first and second oil chambers 104 and 105.

In the central portion of the piston 102, a center hole 107 and a side hole 108 form a communicating path for communicating between the first and second oil chambers 104 and 105. Further, a spool 109 is oil-tightly inserted in the center hole 107 in such a manner that it is capable of sliding along the axial direction thereof, and thus vary the area of the communicating path. That is, the spool 109 has a peripheral ringed groove 109a, a center hole 109b, and a communicating hole 109c for communicating between the groove 109a and the center hole 109b. The spool 109 operates as a so called adjustable restrictor, being capable of adjusting the area of the communicating path by moving the position of the groove 109a between an open position for communication with the side hole 108, and a closed position. One end of the spool 109 (the downward end in FIG. 1) is pushed upward by a spring 111 supported by a stopper 110 press-fitted in the center hole 107, and simultaneously receives a pressure from the oil chamber 105. The other end of the spool 109 (the upward end in FIG. 1) forms an upward end of a projecting portion 109d formed upon the spool 109. This upward end of the projecting portion 109d projects into a sealed chamber 117 (described later). Further, the spool 109 has a small hole 109e for communicating between inner and outer portions of the spool 109 to reduce sliding resistance.

Fixed in the space 112 surrounded by a casing 102a of an upper portion of the piston 102 and the piston rod 103, is a lamination layer type piezo-electric body constituted by laminating a plurality of piezo-electric elements 113a and electrode plates (not shown) alternately. These piezo-electric elements 113a expand and contract on the basis of the reverse piezo-electric effect when a voltage is applied by lead lines 114 passing through the inside of the piston rod 103, and generates an electromotive force according to the stress applied in the axial direction on the basis of the piezo-electrrc effect. The piezo-electric elements 113a are made of, for example, PZT (Partially Stabilized Zirconate) comprising $PbZrO_3$ and $PbTiO_3$ as the main ingredients.

A plunger 115 fixed to the piezo-electric body 113 slides up and down in the space 112 of the casing 102a in accordance with the expansion and contraction of the piezo-electrrc body 113. The sealed chamber 117 is formed by the under surface of the plunger 115, the inner surface of the casing 102a, the upper end surface of the projecting portion 109d, and an O ring, and is oil-tightly filled with, for example, silicone oil. Due to the operation of the sealed chamber, a very small amount of displacement of the plunger 115 when moved by the piezo-electric body 113 is amplified and transmitted to the spool 109 by an amount determined by the ratio of the cross sectional area of the plunger 115 and that of the projecting portion 109d of the spool 109, based on Pascal's principle. Normally, the pressure in the sealed chamber 117 is maintained at approximately 10 to 20 kg/cm³ by means of the spring 111.

When no voltage is applied to the piezo-electric body 113, the spool 109 operates so as to communicate between the first and second oil chambers 104 and 105 through the side hole 108 and restrictor 106, but when a high voltage (about 500 volts) is applied, the spool 109 operates so as to communicate between both oil chambers through only the restrictor 106.

O rings 118 and 119 are for sealing. The O ring 118 is arranged around the periphery of the piston rod 103 to seal the oil chambers 104 and 105, and the O ring 119 is arranged around the periphery of the projecting portion 109d of the spool 109 to prevent the silicone oil leaking from the sealed chamber 117.

A control circuit 2 is electrically connected to the piezo-electric body 113 via the lead line 114.

The mode of operation of the adjustable damping force type shock absorber described above will now be explained.

When no voltage is applied from the control circuit 2 to the piezo-electric body 113, the side hole 108 of the piston 102 and the groove 109a of the spool 109 are communicated with each other, therefore the damping force produced when the piston 102 and the piston rod 103 slide in the cylinder 102 is obtained as the resistance of the force of the working oil flowing through the side hole 108 and the restrictor 106.

When a high voltage (about 500 volts) is applied to the piezo-electric body 113 by the control circuit 2, the piezo-electric body expands by a very small amount of displacement (about 90µ). This displacement is amplified by the ratio of the cross sectional area of the plunger 115 to that of the projecting portion 109d of the spool (about 25 times) due to the function of the sealed chamber 117, and is transmitted as a downward displacement (about 2 mm) of the spool 109 in FIG. 1. At this time, the communication between the side hole 108 and the groove 109a of the spool 109 is interrupted by the above displacement. As a result, the damping force of the shock absorber 1 is obtained on the basis of the resistance of the force of the working oil flowing through the restrictor 106. This resistance force is greater than the resistance force mentioned previously (i.e., in the case where no voltage is applied to the piezo-electric body 113) by the amount originating in the closing of the side hole 108, therefore the damping force of the shock absorber is increased.

As described above, the damping force of the shock absorber 1 can be changed between two states, i.e., a hard damping force state and a soft damping force state, by ON-OFF control of the applied voltage of the piezo-electric body 113 by the control circuit 2.

In the above described explanation, the damping force of the shock absorber 1 is changed into two states by ON-OFF control of the voltage applied to the piezo-electric body 113. However, it is also possible to change the damping force of the shock absorber 1 from the soft state to the hard state continuously, by changing the voltage applied to the piezo-electric body 113 from zero volt to a high voltage (about 500 volts) continuously.

The mode of operation of the piezo-electric body 113 for detecting the motion of the vehicle on the basis of the pressure change in the oil chambers 104 and 105 of the shock absorber 1 will now be explained.

In the operation of the shock absorber 1, for example, when the piston 102 is moved down in the cylinder 102, the working oil flows from the second oil chamber 105 to the first oil chamber 104 through the side hole 108 and the restrictor 106 of the piston 102. At this time, the pressure in the second oil chamber 105 rises, due to the fluid resistance of the working oil, as a result, pressure is exerted on the under end surface of the spool 109 to push it up.

The plunger 115 following the piezo-electric body 113 and the spool 109 is constituted so that the displacement of one is transmitted to the other by the silicone oil in the sealed chamber 117, therefore when the pressing force is exerted on the under end surface ot the spool 109 the pressure of the sealed chamber 117 increases according to the pressing force. This pressure change exerts the pressing force on the piezo-electric body 113 via the plunger 115, so that the piezo-electric body 113 generates the electromotive force voltage on the basis of the piezo-electric effect. This voltage is introduced to the control circuit 2 via the lead line 114 to decide the motion of the vehicle.

In the example described above, since the displacement of the piezo-electric body 113 is very small, that displacement is amplified and transmitted to the spool 109 by the function of the sealed chamber 117. However, where the spool 109 is directly driven by the displacement of the piezo-electric body 113, the opening and closing of the side hole 108 of the piston 102 is effected, and the sealed chamber 117 becomes unnecessary.

Further, it can be easily understood by a person skilled in the art that when the cross sectional area of the communication path formed by the center hole 107 and the side hole 108 is large enough, the operation and effect as described above will be obtained even if the restrictor 106 formed in the piston 102 is omitted.

FIG. 2 is a schematic representation of the control apparatus for the shock absorber 1. In FIG. 2, the control circuit and a wheel are represented by the reference characters 2 and 3, respectively. The shock absorbers 1 are installed at both wheels 3 on the front side and rear side, respectively. In FIG. 3, 1 (FR) denotes the shock absorber 1 installed at the front right wheel, 1 (FL) that at the front left wheel, 1 (RR) that at the rear right wheel, and 1 (RL) that at the rear left wheel. The shock absorbers 1 (FR), 1 (FL), 1 (RR), and 1 (RL) are connected to the control circuit 2, respectively.

FIG. 3 is a detailed circuit diagram of the control circuit 2. In FIG. 3, the control circuit 2 comprises a high voltage power supply DC-DC converter 21, four switches 221 to 224 for switching the output voltage of the high voltage power supply 21, four resistive dividers $23_1$ to $23_4$ for dividing the voltage generated by the piezo-electric body 113 of the shock absorbers 1 (FR), 1 (FL), 1 (RR), and 1 (RL) respectively, four low-pass filters $25_1$ to $25_4$ for deriving low frequency components from the divided output voltage of the piezo-electric body 113, four comparators $26_1$ to $26_4$ for comparing the filtered signals of the low-pass filters with the predetermined reference level $V_R$ to generate "1" or "0" level signals, a logic circuit having four AND circuits $27_1$ to $27_4$ and OR circuit 28 for distinguishing the signal output from the piezo-electric body 113 of the four shock absorbers, and a timer circuit 29 responsive to the signal output of the logic circuit to close the switches $22_1$ to $22_4$ for a predetermined time (for example, 2 seconds).

The logic circuit is constituted so that the AND circuits $27_1$ output a "1" level signal when the piezo-electric bodies 113 of the shock absorbers 1 (FR) and 1 (FL), simultaneously output voltages exceeding the reference voltage $V_R$ to the comparator $26_1$ and $26_2$ respectively. In the same way as the AND circuits $27_1$ the AND circuit $27_2$, $27_3$ and $27_4$ output a "1" level signal according to the output signals of the shock absorbers 1 (RR) and 1 (RL), 1 (FR) and 1 (RR), and, 1 (RL) and 1 (RL) respectively, and the OR circuit 28 outputs a "1" level signal according to the "1" level signal of at least one of the AND circuits $27_1$ to $27_4$.

The mode of operation of the control apparatus including the adjustable damping force type shock absorber according to the present invention will now be described.

In the present apparatus, in the same way as the control apparatus of the prior art, obviously, it is easy to switch the damping force to the soft or hard state by manual operation, i.e., by switching on or off the high voltage applied to the piezo-electric body 113 of the shock absorber according to the desired state (the circuit for the manual operation is omitted).

The most important point of the present control system is that it will carry out easily and simply the so called automatic function for automatically switching the damping force to the soft or hard state according to the running state of the vehicle.

In the automatic mode of the present apparatus, the running state of the vehicle is forecast (or detected at an early stage) on the basis of the output voltage signals generated by the piezo-electric bodies 113 included in four shock absorbers 1 (FR), 1 (FL), 1 (RR) and 1 (RL) installed at the four wheels of the vehicle, and the damping force is then switched rapidly from soft to hard or vice versa according to the detected running state. In the present apparatus, the change of the damping force from soft to hard in an automatic mode is performed upon rapid acceleration from a standstill, upon hard braking, and when the vehicle is subjected to slaloming, and thus "squat", "nose-diving", and "rolling" are prevented. Therefore, controllability of the vehicle is improved and the driving comfort during normal running is improved.

The manner of forecasting a rapid acceleration, hard braking, and slaloming, on the basis of the generated voltage of the piezo-electric bodies 113 included in four shock absorbers, will be explained hereinafter.

When a rapid acceleration from a standstill is made, the squat phenomenon occurs, the shock absorbers 1 (RR) and 1 (RL) installed at two rear side wheels contract. Accordingly, voltage signals are simultaneously generated from the shock absorbers 1 (RR) and 1 (RL) installed at the rear wheels, then the damping force is changed from soft to hard according to the detection of these voltage signals, to prevent the squat phenomenon. That is, the output signal of the AND circuit $27_4$ becomes "1", whereby the switches $22_1$ to $22_4$ are closed for a predetermined time by the timer circuit 29 so that the high voltage at the high voltage power supply 21 is applied to the piezo-electric bodies 113 of the shock absorbers 1 (FR), 1 (FL), 1 (RR) and 1 (RL).

When a hard braking is carried out, due to the nose-diving phenomenon that occurs, the voltage signals are simultaneously generated from the shock absorbers 1 (FR) and 1 (FL) installed at the front wheels. By detecting these signals, the damping force is changed from soft to hard to prevent the nose-diving phenomenon. At this time, the output signal of the AND circuit $27_1$ is "1".

Also when the vehicle is subjected to slaloming, the "rolling" phenomenon occurs away from the cornering direction. At this time, since either the right side two shock absorbers or the left side two shock absorbers contract, either the voltage signals of the shock absorbers 1 (FR) and 1 (RR) or the voltage signals of the shock absorbers 1 (FL) and 1 (RL) are generated simultaneously, and upon receiving these voltage signals, the damping force is changed from soft to hard to restrain the "rolling" movement. The output signal of the AND gate $27_2$ or $27_3$ is "1" at this time.

As described heretofore, in the control circuit 2 of the present apparatus, the voltage signals generated from the piezo-electric bodies of each shock absorber according to the aforementioned phenomena of "squat", "nose-diving", or "rolling" are compared with the predetermined reference voltage $V_R$ by the comparators, then when these generated voltage signals are greater than the reference voltage $V_R$, the signals from the comparators are input to the logic circuit constituted by the combination of the AND circuits and OR circuit, and the above phenomena resulting from the running state of the vehicle are forecast, thereby the switches $22_1$ to $22_4$ are actuated during a predetermined time. (2 seconds) to apply the high voltage of the high voltage power supply 21 to the piezo-electric bodies 113 of the shock absorbers 1. Further, the generated voltages of the shock absorbers 1 are divided by the voltage dividers 23 and filtered by the filters 25 having a predetermined characteristic (low-pass filter) to cut off the relative high frequency component resulting from the up and down vibration generated by the rough surface of a road.

Figure 4:
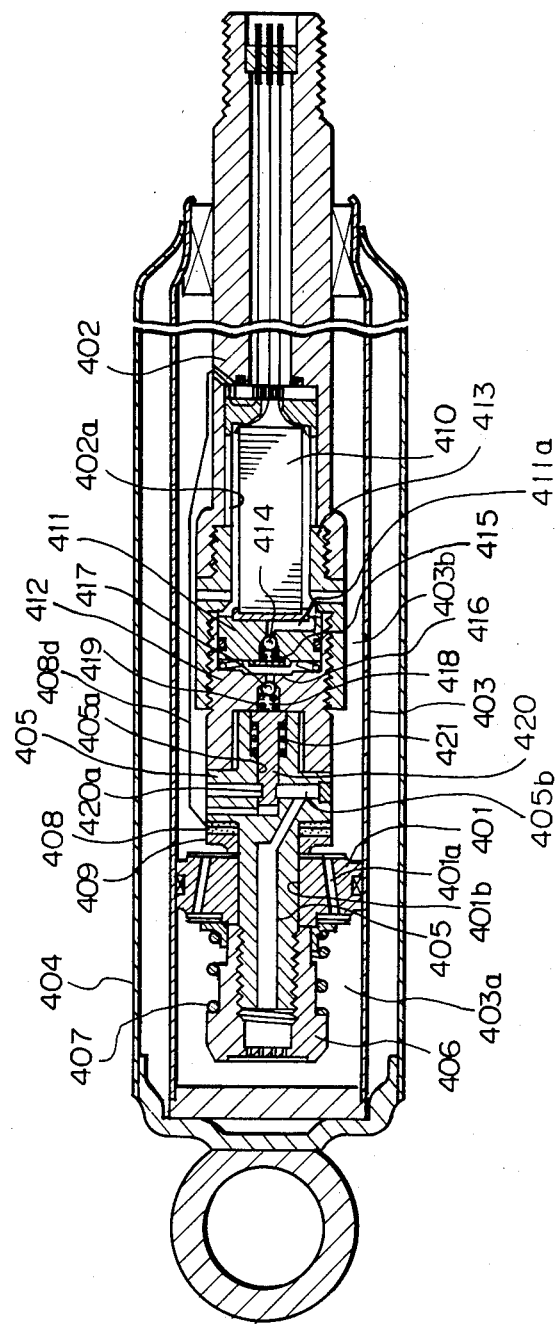
FIG. 4 shows a cross sectional view of a second embodiment of the shock absorber according to the present invention.

FIG. 4 shows a cross sectional view of another embodiment of the adjustable damping force type shock absorber according to the present invention. In FIG. 4, a piston 401 is inserted in the cylinder 403 (internal cylinder) in a slidable manner, whereby the inner space of the cylinder 403 is substantially separated into two oil chambers 403a and 403b by the piston 401. This cylinder 403 is housed in the outer shell 404 (outer cylinder), and the outer shell 404 is fixed to the wheel axle. The piston 401 has a restriction orifice 401a for communicating between the oil chambers 403a and 403b.

Reference 402 denotes a rod connected to the piston 401. At the top end portion of the rod 402, a member 405 is slidably fitted in an apertured portion 401b formed in the piston 401. The top end portion of the member 405 is fitted with a screw-cap nut 406 for supporting a coil spring 407 inserted between the nut 406 and the member 405, whereby the piston 401 is pushed toward the rod 402 and is put under a pressure. A ring damping force sensor (load sensor) 408 fitted around the member 405 is fixed between the piston 401 and the member 405 by a retainer 409. Accordingly, the pressing force from the cap nut 406 is exerted on the damping force sensor 408 via the piston 401 and the retainer 409.

Figure 5:
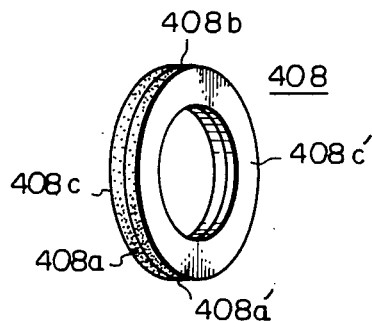
FIG. 5 and FIG. 6 show a damping force sensor, respectively.
Figure 6:
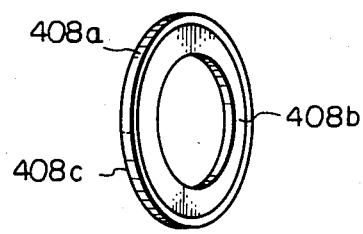

The ring damping force sensor 408 is made from piezo-electric elements constituted as shown in FIG. 5. That is, a sensor element is constituted by forming an electrode 408b by evaporating or bonding the metal plate at both surfaces of the ring piezo-electric element 408a, as shown in FIG. 6, then bonding two sensor elements each other in such a manner that the polarization direction of each is reversed. As described before, the piezo-electric element may be made of PZT (lead titanate zirconate) or an element having the piezo-electric effect such as barium titanate, etc. This piezo-electric element generates a charge at its surface according to the stress exerted on the piezo-electric element in the thickness direction. The electrodes 408c and 408c' of the damping force sensor 408 are grounded via the member 405 and the rod 402, and a lead line 408d connected to the electrode 408b is led from the shock absorber through the inside of the rod 402 and then connected to the control apparatus.

Note, the damping force sensor may, of course, be made by a single sensor element as shown in FIG. 6. However, in such a case the sensor must be installed in the shock absorber in the state where at least one side electrode is isolated, to prevent short-circuiting between the electrodes 408b and 408c. On the contrary, according to the construction of FIG. 5, one side electrode 408b is naturally isolated since it is located between the piezo-electric elements 408a and 408a'. Further, when the load is applied, the voltage difference having the same polarity with regard to the electrode 408b is generated at the electrodes 408c and 408c'. Therefore, it does not matter if the electrodes 408c and 408c'0 are in electrically contact with the electrically conducting member, and accordingly, an isolation process is not needed. In addition, according to the construction of FIG. 2, since the amount of the generated charge is twice that of the single sensor, the signal process operation at the latter stage is easier. Further, if it is desired to raise the generated voltage for the load, this can be executed by laminating a plurality of the sensor elements in the same polarization direction.

A mechanism for adjusting the damping force is arranged between the rod 402 and the member 405. This mechanism will be explained below. The piezo-electric actuator 410 is housed in the chamber 402a formed in the rod 402. The piezo-electric actuator 410 is constituted by laminating a plurality of discoidal piezo-electric elements, with electrode plates inserted between adjacent elements. One side of the electrode is formed by connecting alternate electrode plates in parallel, and the other electrode is formed by connecting residual alternative electrode plates in parallel. This piezo-electric actuator 410 is expanded or contracted by applying a voltage between the above described two electrodes.

At the top portion of the piezo-electric actuator 410, a plunger 411 is slidably fitted in the housing 412. The housing 412 is fixed to a member 413 by the rod 402. A non-return valve comprising a ball 414 and a spring 415 is housed inside of the plunger 411 and the housing 412. A chamber 416 formed between the plunger 411 and the housing 412 is communicated with a pressure chamber 419 formed at the opposite side of the housing 412, and a non-return valve mechanism comprising a ball 417 and a spring 418 is housed in this pressure chamber 419.

The other apertured portion of the pressure chamber 419 is covered by a small piston 420 slidably fitted in a cylinder portion 405a formed in the member 405 and pushed in the rod direction by a spring 421. The small piston 420 has a groove 420a around the peripheral surface of the other end of the small piston 420. The member 405 has a flow path 405b, one end of which is communicated with the oil chamber 403a and the other end of which is communicated with the oil chamber 403b. Accordingly, the oil chambers 403a and 403b may be communicated through the groove 420a and the flow path 405b, and the flow path 405b can be blocked by the displacement of the small piston 420 toward the piston 401.

The mode of operation of the damping force adjusting mechanism will be now explained.

When no voltage is applied between the two electrodes of the piezo-electric actuator 410, and therefore no movement of the piezo-electric actuator 410 is caused, the groove 420a of the small piston 420 is located at the position shown in FIG. 4, and the oil chambers 403a and 403b are communicated through the flow path 405b and the groove 420a. Accordingly, when a relative motion between the cylinder 403 and the rod 402 connected to the body of the vehicle is caused due to the expansion and contraction of the shock absorber, the working oil flows from the oil chamber 403a to the oil chamber 403b, or vice-versa, through both the orifice 401a and the flow path 405b. Due to the flow of the working oil, a pressure difference is produced between the oil chambers 403a and 403b, and a load is exerted on the piston 401. This load is converted into the damping force of the shock absorber. In this case, since the damping force is generated on the basis of the flow of the working oil passing through both the orifice 401a and the flow path 405b, the magnitude of that is relatively small.

On the other hand, when the alternating voltage or the continued pulse voltage is applied between the two electrodes of the piezo-electric actuator 410, the actuator 410 repeatedly expands and contracts to move the plunger 411, whereby the volume of the cavity 416 expands or reduces alternately. These members then act as a pump, due to the function of the balls 414 and 417 as the non-return valve, and, accordingly the working oil is sent in the pressurized state from the oil chamber 403b through a flow path 411a and the chamber 416 to the pressure chamber 419 according to the volume change of the chamber 416. Due to the pressure force of the working oil, the small piston 420 moves toward the piston 410 to block the flow path 405b of the member 405. As a result, the oil chambers 403a and 403b are communicated by only the orifice 401a, therefore the load added to the piston 401 according to the speed of the expansion and contraction of the shock absorber (i.e., the damping force) becomes greater than when the piezo-electric actuator 410 is not operated. As described above, the damping force of the shock absorber can be changed, whether or not the voltage is applied to the piezo-electric actuator 410.

The mode of operation of the damping force sensor 408 will now be explained.

In the normal state, the damping force sensor 408 is subjected to a constant pressing force by the cap nut 406 and the spring 407. When the shock absorber is compressed, the load, i.e., the damping force, toward the rod 402 is exerted on the piston 401, and that damping force is exerted on the damping force sensor 408 via the retainer 409 to increase the pressing force now applied to the damping force sensor 408. Therefore, the damping force sensor 401 generates a positive output voltage substantially proportional to the magnitude of the generated damping force.

On the other hand, when the shock absorber expands, the damping force toward the cap nut 406 is exerted on the piston 401, and the magnitude of the pressing force applied to the damping sensor 408 is reduced by this damping force. Accordingly, the damping force sensor 408 generates a negative output voltage substantially proportional to the generated damping force. As described above, the damping sensor 408 generates the output signal according to the change of the damping force generated in the shock absorber.

Figure 7:
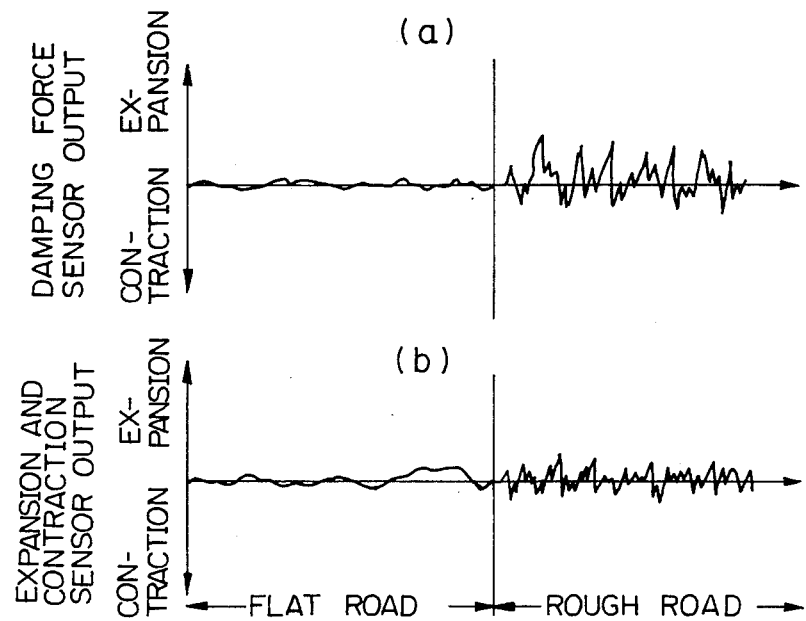
FIG. 7 shows the characteristics of the output signals of the damping force sensor of the present invention and of the extension and contraction sensor of the prior art.

FIG. 7 is a signal waveform diagram showing the difference between the output signal of the damping force sensor according to the present invention and the output signal of the expansion and contraction sensor of prior art on a flat road and on a rough surface road. In FIG. 7, (a) is the output signal of the damping force sensor, and (b) is the output signal of the expansion and contraction sensor. The mechanism for adjusting the damping force is maintaind at one state, i.e., either a high or a low damping force state. As clear from FIG. 7, in the case of the expansion and contraction sensor, the output signal level on the rough road is no different so far to that of the flat road. On the other hand, in the case of the damping force sensor, the difference of the output signal levels between the flat road and the rough road is great, therefore the state of the road can be detected precisely.

Figure 8:
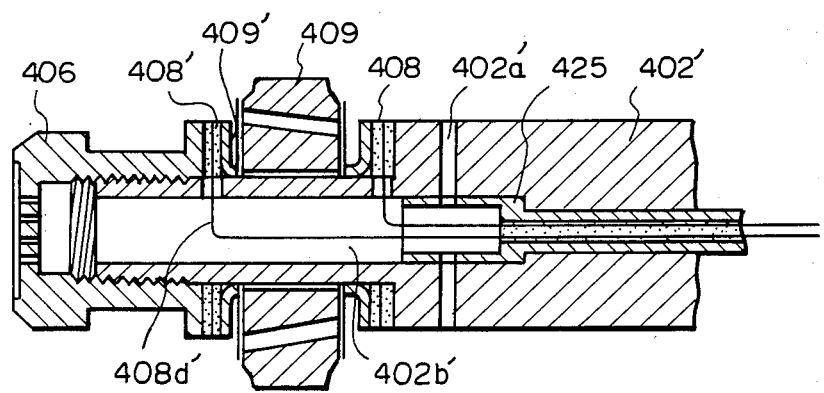
FIG. 8 and FIG. 9 show a third and fourth embodiments of the shock absorber according to the present invention, respectively.

FIG. 8 shows another embodiment of the present invention. In this example, the damping force sensors are mounted in both oil chambers of the cylinder separated by the piston, and thus a positive output signal for detecting the damping force is always obtained in either case of expansion and contraction of the shock absorber. Further, the mechanism for adjusting the damping force is different from that of FIG. 4.

That is, in the case of FIG. 4, the damping force sensor is mounted in only the oil chamber 403b located at one side of the piston 401. Therefore, the positive or negative output voltage appears on the output line 408d of the damping force sensor 408 according to the direction of the load applied to the piston 401. However, the circuit for processing the output signal of the damping force sensor mounted on the car is often constituted to be able to process the positive signal only. Hence this circuit cannot easily detect the load applied in the direction where the negative voltage is generated. The example of FIG. 8 is provided to solve this problem.

In FIG. 8, the top portion of a rod 402' is formed as a small cylindrical portion, and the piston 401 and cap nut 406 is fitted around this small cylindrical portion. At the rod 402' side of the piston 401, the damping force sensor 408 is retained between the rod 402 and a retainer 9 in a pressurized state, and at the cap nut 406 side of the piston 401, the damping force sensor 408' is retained between a retainer 409' and the cap nut 406. The output lines of the damping force sensor 408 and 408' are introduced to an external control device through the inside of the small cylindrical portion of the rod 2', inside of the rotary valve 425, and inside of the rod 2'.

The constitution of FIG. 8 ensures that, even if the load is exerted on the piston 401 in either axial direction, the output signal of the positive voltage corresponding to the load is obtained from either of two damping force sensors 408 and 408'. Further, in this example, the mechanism for adjusting the damping force is constituted so that the rotary valve is rotated by a rotary actuator arranged outside the shock absorber to control the opening and closing between the flow paths 402a' and 402b' In addition, in place of the rotary actuator, for example, a small size motor inserted in the rod may be utilized to control the opening and closing of the flow path.

Figure 9:
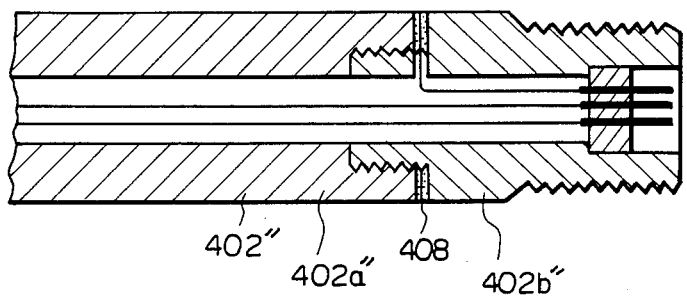

FIG. 9 shows another embodiment of the present invention. In this example, the end portion of the rod 402' is divided into two portions 402a" and 402b", and the damping force sensor 408 is located between those two portions. By this construction the damping force exerted on the rod may be also detected. As described above, various positions of the shock absorber may be selected for mounting the damping force sensor.

In addition, as a damping force sensor, it is preferable to use the piezo-electric element having the characteristic of outputting the voltage in response to a change of the load. This is because it is not necessary to attempt to detect a static load, since the damping force changes periodically. Further, the piezo-electric elements such as PZT, etc., have the advantages of endurance against a high load, small size, and being easily mounted. In this respect, it is preferable to use the piezo-electric element as the damping force sensor.

Figure 10:
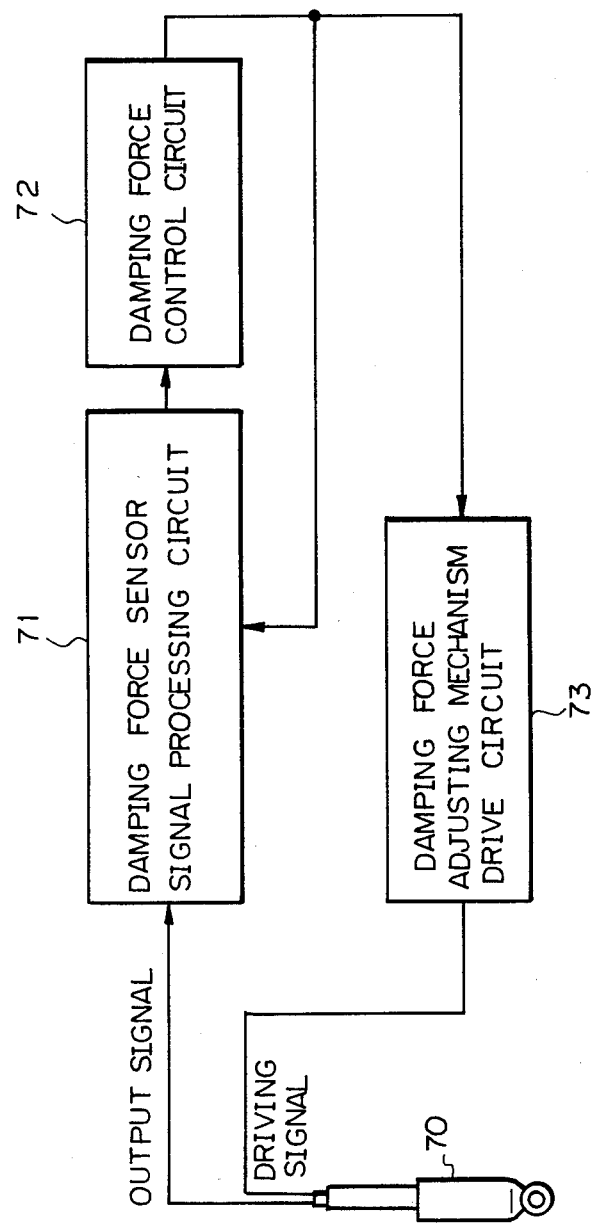
FIG. 10 shows another embodiment of the control apparatus for the shock absorber of FIG. 4 according to the present invention.

FIG. 10 shows an apparatus for processing the output signal delivered from the damping force sensor of the shock absorber shown in FIG. 4. In the shock absorber of FIG. 4, the magnitude of the output signal delivered from the damping force sensor for the same road state is different, depending upon whether the damping force adjusting mechanism is set at the high damping force state or at the low damping force state. Accordingly, the road state such as a rough surface of the road cannot be detected directly from the magnitude of the output signal of the damping force sensor.

The apparatus of FIG. 10 is provided to solve this problem. That is, the apparatus carries out a process wherein the detecting sensitivity is changed according to the set state of the damping force adjusting mechanism. In more detail, in this process, the sensitivity for detecting the output signal of the damping force sensor is reduced corresponding to the increment of the damping force by the damping force adjusting mechanism or vice-versa, and thus the road state can be precisely detected on the basis of the output signal of the damping rorce sensor without influence by the set damping force state.

In FIG. 10, 4 denotes the shock absorber of FIG. 4. Here, the output signal of the damping force sensor 408 in the shock absorber is introduced to the damping force sensor signal processing circuit 71; the output signal of the processing circuit 71 is introduced to the damping force control circuit 72; the output signal of the control circuit 72 is introduced to the damping force adjusting mechanism drive circuit 73, and at the same time, to the control input terminal for changing the sensitivity of the processing circuit 71; and the output signal of the drive circuit 73 is introduced to the piezo-electric actuator 410 in the shock absorber 4.

In this apparatus of FIG. 10, the control circuit 72 receives the output signal from the processing circuit 71 and detects that level, and decides to output either a high level signal or a low level signal on the basis of the detected level and information such as vehicle speed signal from the vehicle speed sensor. When the output signal from the control circuit 72 is low level, the drive circuit 73 actuates the damping force adjusting mechanism and it is set at the high damping force position, and at the same time the processing circuit is set to be changed to the low sensitivity mode. On the other hand, when the output signal from the control circuit 72 is high level, the damping force adjusting mechanism is set to the low damping force position and the processing circuit 71 is changed to the high sensitivity mode.

Consequently, the magnitude of the detection signal from the damping force sensor 408 input to the control circuit 72 always precisely corresponds to the road state, irrespective of the set position of the damping force adjusting mechanism.

Figure 11:
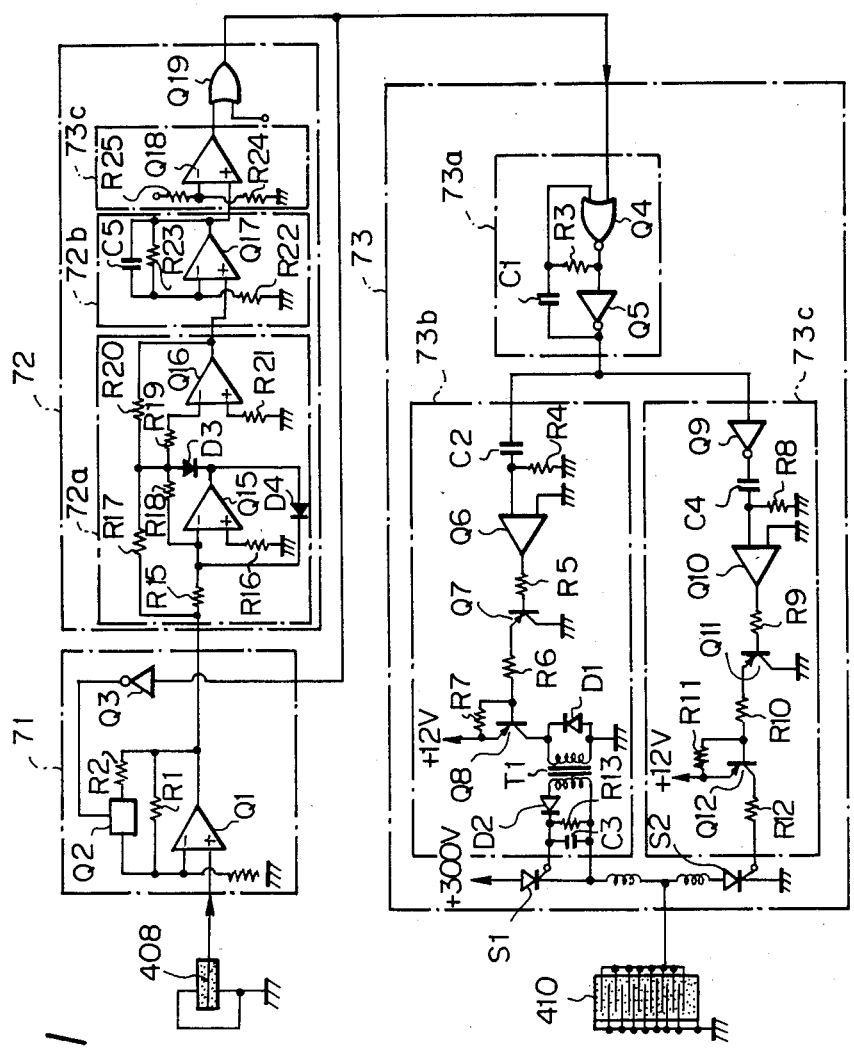
FIG. 11 is a more detailed circuit diagram of FIG. 10.

FIG. 11 is a more detailed circuit diagram of FIG. 10. In FIG. 11, the processing circuit 71 comprises an operational amplifier Q1 for amplifying the output signal from the damping force sensor 408 and outputting it to the control circuit 72, two parallel connected feedback resistors R1 and R2 connected in the feedback circuit of the operational amplifier Q1, an analog switch Q2 connected in series with the resistor R2, and an invertor Q3 for inverting the output signal from the control circuit 72 and applying it to the switch controlling input terminal of the inverter Q3.

The control circuit 72 comprises a full-wave rectification circuit 72a for converting the input signal to the positive voltage signal, an amplifying circuit 72b for adjusting the voltage level of the positive voltage signal, a comparator 73c for comparing the output signal of the amplifying circuit 72b, and a OR circuit Q19 to which the output signal of the comparator 73c and other control signals independent of the damping force sensor, such as the vehicle speed signal, are input for setting the shock absorber to the high damping force mode when running at high speed.

The full-wave rectification circuit 72a comprises two operational amplifiers Q15 and Q16, two diodes D3 and D4, and seven resistors R15 to R21. The amplifying circuit 72b comprises an operational amplifier Q17, two resistors R22 and R23, and a capacitor C5. The comparator 73c comprises an operational amplifier Q18, and two resistors R24 and R25. In this control circuit, when the damping force signal becomes greater than the predetermined voltage determined by the resistors R24 and R25, the comparator 73c outputs the high level output signal, and thus the OR circuit Q19 outputs the high level output signal to the drive circuit 73.

The drive circuit 73 comprises an oscillator including a NOR circuit Q4 and a inverter Q5, a firing circuit 73b for a thyristor S1 including an operational amplifier Q6, two transistors Q7 and Q8, two diodes D1 and D2, and a pulse transformer T1, and a firing circuit 73c for a thyristor S2 including a inverter Q9, an operational amplifier Q10, and two transistors Q11 and Q12. The output signal from the drive circuit is applied to one side of the electrodes of the piezo-electric actuator 410. The other side of the electrode is grounded.

The mode of operation of the circuit shown in FIG. 11 will explained below. When the detected output signal from the damping force sensor 408 is input into the processing circuit 71, that signal is amplified by the operational amplifier Q1, and subsequently, is output to the control circuit 72. The control circuit 72 decides whether to set the damping force of the shock absorber at a high or low level, according to the output signal level of the damping force sensor 408 and the vehicle speed signal etc. In this example, the output signal is low level when the damping force is to be set at a high level, and at a high level when the damping force is at a low level.

When the output signal of the control circuit 72 is low level, the oscillator 73a in the drive circuit 73 begins to oscillate and outputs a short wave oscillation output. The firing circuits 73b and 73c are actuated by this oscillation output to conduct the thyristors S1 and S2, alternately. As a result, a train of continuous high voltage pulses are applied to the piezo-electric actuator 410, and thus the piezo-electric actuator 410 repeatedly expands and contracts. Accordingly, the damping force adjusting mechanism adjusts the damping force of the shock absorber to a high damping force state. At the same time, the low level output signal of the control circuit 72 is input to the sensitivity changing input terminal of the processing circuit 71. This low level signal is inverted to a high level by the inverter Q3, and subsequently, is input to the controlling input terminal of the analog switch Q2 to conduct that switch Q2. Consequently, the feedback resistance of the operational amplifier is constituted by the parallel connected resistors R1 and R2, and thus the amplification of the operational amplifier Q1 is decreased.

On the other hand, when the output signal of the control circuit 72 is low level, the oscillator 73a does not oscillate, and accordingly, the train of high voltage continuous pulses is not applied to the piezo-electric actuator 410, as a result the shock absorber is set at the low damping force state. In this case, the analog switch Q2 in the processing circuit 71 is switched off, and thus the amplification of the operational amplifier Q1 increases, since the amplification is determined by only the feedback resistor R1.

FIG. 12 shows another embodiment of the control apparatus for the adjustable damping force type shock absorber according to the present invention. In FIG. 12, 4 (FR) and 4 (FL) are the shock absorbers of the present invention installed at the right and left side front wheels, respectively, and 5 (RR) and 5 (RL) are the shock absorbers having the damping force adjusting mechanism, installed at the right and left side rear wheels, respectively. The detected output signals of the shock absorbers 4 (FR) and 4 (FL) are introduced to the signal processing circuits 71R and 71L respectively. The output signal of the signal processing circuit 71R is directly introduced to a control circuit 72', and is also introduced to the control circuit 72' via a level judging circuit 91R, a signal delay circuit 92R, and a timer circuit 93R. From the control circuit 72', the drive instruction signal is output to the drive circuit 73R and the sensitivity changing input terminal of the signal processing circuit 71R. The driving output signal of the drive circuit 73' is applied to the piezo-electric actuators 410 of the shock absorber 4 (FR).

For the shock absorber 4 (FL) of the front left wheel, the same circuits such as a signal processing circuit 72L, a level judging circuit 91L, a signal delay circuit 92L, a timer circuit 93L, and a drive circuit 73L are provided. The vehicle speed signal, the brake signal, and the steering wheel angle signal, etc., obtained from the various sensors installed at various portions of the vehicle are also input to the control circuit 72'. The driving output signals from the drive circuit 73(r) and 73(l) actuated by the instruction signals from the control circuit 72' are input respectively to the shock absorbers 5 (RR) and 5 (RL) at the rear wheels to actuate the damping force adjusting mechanism.

The mode of operation of the FIG. 12 apparatus will be explained below. When the vehicle passes over a convex or sunken portion of the road surface, it is preferable that the damping force of the shock absorber be set to the soft state at the moment when the vehicle passes over such portions, and subsequently, is set to the hard state to suppress vibration of the vehicle. In the apparatus of FIG. 12, the convex and sunken road portions are detected by the damping force sensor of the shock absorber installed at the front wheel, and according to that detected signal, the damping force of the shock absorber installed at the rear wheel is changed to the optimum state just before and just after the time the rear wheel passes the convex and sunken road portions.

That is, the passage of the vehicle over the convex and sunken portions of the road surface is detected by detecting the output signal of the damping force sensor located in the front wheel shock absorbers 4 (RR) and 4 (RL) and judging the level of that output signal at the level judging circuits 91R and 91L. This detected signal passes through the signal delay circuits 92R and 92L having a delay time varied according to the vehicle speed and the timer circuits 93R and 93L, and subsequently, is input to the control circuit 72'. The control circuit 72' outputs the drive instruction signals to the drive circuits 73(r) and 73(l) to actuate the damping force adjusting mechanisms of the shock absorbers 5 (RR) and 5 (RL) so that the damping force of the rear wheel shock absorbers is changed at the timing when the rear wheels pass over the convex and sunken road portions.

One manner of changing the damping force of the rear wheel shock absorbers will be explained below. Where the rear wheel shock absorbers are set at the high damping force state as the initial state, when the detected signal which indicates that the front wheel is passing over the convex and sunken road portion is output from the font wheel shock absorber, the rear wheel shock absorber is changed to the low damping force state after the delay time determined by the vehicle speed has elapsed at the signal delay circuit, to provide for the passage of the vehicle over such road portions. This low damping force state is maintained during a constant time, also determined by the vehicle speed, and during that constant time, the rear wheel passes through the convex and sunken road portions. After the constant time has elapsed, the rear wheel shock absorber returns to the initial high damping force state.

Where the initial state of the rear wheel shock absorber is the low damping state, when the passage over the convex and sunken road portions is detected by the front wheel shock absorber, the rear wheel shock absorber is maintained continuously at the low damping force state until the rear wheel passes over the convex and sunken road portions. However, after the rear wheel has passed over those portions, the rear wheel shock absorber is changed to the high damping force state for a constant time to suppress vibration in the vehicle car, and subsequently, is returned to the low damping force state.

Thus it will be appreciated from the above that as a result of the present invention, a highly effective adjustable damping force type shock absorber is provided by which the principal objectives, among others, are completely fulfilled. It will be equally apparent and is contemplated that modification and/or changes may be made in the illustrated emodiment without departure from the invention. Accordingly, it is expressly intended that the foregoing description and accompanying drawings are illustrated of preferred embodiments only, not limiting, and that the true spirit and scope of the present invention will be determined by reference to the appended claims and their legal equivalent.

We claim:

1. An adjustable damping force type shock absorber having first and a second oil-containing chambers on opposite sides of a piston slidably mounted in a cylinder, the shock absorber comprising:

a communicating path formed in the piston for communicating between the first and the second chambers;

a sliding member for changing the passage area of the communicating path by a sliding displacement thereof, one end surface of said sliding member being exposed to the oil in said second oil containing chamber and responsive to the oil pressure from said second oil chamber; and a piezo-electric body coupled to said sliding member and responsive to the stress applied thereto by said sliding member to generate a voltage in response to the stress, said stress being a direct compressive force exerted along the direction of an axis of a rod of said piston in accordance with an oil pressure generated in said first and second chambers when said shock absorber expands or contracts, and for causing displacement of said sliding member by expansion and contraction of said piezo-electric body in response to a voltage applied thereto;

wherein said displacement of said piezo-electric body is transmitted to said sliding member via a sealed chamber comprising a casing, a plunger following said piezo-electric body in said casing, and the other end surface of said sliding member, said sealed chamber being filled with a non-compressible fluid, said displacement of said piezo-electric body being amplified by the ratio of a cross-sectional area of said plunger to that of said other end surface of said sliding member.

2. An adjustable damping force type shock absorber according to claim 1, wherein said piezo-electric body is a lamination layer type piezo-electric body constituted by laminating in an axial direction a plurality of piezo-electric elements having a piezo-electric effect in which application of a stress in the axial direction causes generation of a voltage, and having a reverse piezo-electric effect in which application of a voltage thereto causes displacement of said sliding member in response to expansion and contraction of said piezo-electric body in the axial direction.

3. An adjustable damping force type shock absorber according to claim 1, wherein said piezo-electric body comprises a plurality of piezo-electric elements laminated together in the axial direction and having a piezo-electric effect in which application of a stress in the axial direction causes generation of a voltage, and a reverse piezo-electric effect in which application of a voltage causes an axial expansion or contraction displacement.

4. An adjustable damping force type shock absorber comprising:

a cylinder;

a piston slidably inserted in the cylinder so that an inner space of the cylinder is substantially separated into two chambers, and having a communicating path for communicating between the chambers, said chambers and said communicating path containing a working fluid;

a sliding member arranged in the piston in a slidable manner so that an area of the communicating path of the piston can be adjusted;

a piezo-electric body positioned in the piston and coupled to the sliding member to effect sliding movement thereof in response to expansion and contraction of the piezo-electric body to adjust the area of the communicating path on the basis of a reverse piezo-electric effect;

a damping force sensor arranged at a predetermined position in a rod supporting the piston to receive a compressive force exerted along the direction of the axis of the rod via the piston when the piston moves within the cylinder and to convert the received compressive force into an electric signal; and a control circuit for outputting a driving signal adjusting a damping force of the shock absorber to the piezo-electric body on the basis of the electric signal from the damping force sensor.

5. An adjustable damping force type shock absorber according to claim 4, wherein said piezo-electric body is a lamination layer type piezo-electric body constituted by laminating a plurality of piezo-electric elements.

6. An adjustable damping force type shock absorber according to claim 5, wherein said lamination layer type piezo-electric body comprises electrode plates inserted between adjacent piezo-electric elements and forming, respectively, a first electrode by connecting alternate electrode plates in parallel and a second electrode by connecting residual alternate electrode plates in parallel.

7. An adjustable damping force type shock absorber according to claim 4 wherein the other end of said sliding member is directly connected to said end of said piezo-electric body so that the expansion and contraction of said piezo-electric body is directly transmitted to said sliding member.

8. An adjustable force type shock absorber as set forth in claim 4, said control apparatus being installed at a front wheel, wherein the damping force of the rear wheel shock absorber is controlled on the basis of the output signal of the damping force sensor of the front wheel shock absorber.

9. An adjustable damping force type shock absorber comprising:
a cylinder;
a piston slidably inserted in the cylinder so that an inner space of the cylinder is substantially separated into two chambers, and having a communicating path for communicating between the chambers;
a mechanism means for adjusting the damping force by changing a cross-sectional area of the communicating path;
a damping force sensor arranged at a predetermined position in a rod supporting the piston, where at a compressive force exerted along the direction of the axis of the rod via the piston when the piston slides within the cylinder is exerted, to output an electric signal corresponding to the compressive force as a damping force signal; and
a control circuit for outputting an adjusting signal adjusting the damping force to the mechanism means on the basis of the damping force signal from the damping force sensor.

10. An adjustable damping type shock absorber according to claim 9, wherein said damping force adjusting mechanism comprises a sliding member capable of changing the passage area of the communicating path by a sliding displacement thereof, one end surface of said sliding member being exposed to said second oil chamber; and
a piezo-electric body arranged at the other end surface of said sliding member, displacement of said piezo-electric body transmitted to said sliding member via a sealed chamber filled with a non-compressible fluid, said chamber comprising a casing, a plunger slidably mounted in said casing, and an end surface of said sliding member, a displacement of said piezo-electric body being amplified by the ratio of a cross-sectional area of said plunger to that of said end surface of said sliding member.

11. An adjustable damping force type shock absorber according to claim 9, wherein said damping force sensor is a piezo-effect transducer means for sensing the damping force exerted on the shock absorber, said piezo-effect transducer generating an electrical signal corresponding to the damping force.

12. An adjustable damping force type shock absorber according to claim 11, wherein said piezo-electric transducer is fabricated from PZT.

13. An adjustable damping force type shock absorber according to claim 12, wherein the damping force sensor comprises two piezo-electric elements bonded together so that the polarization direction of each element is reversed.

14. An adjustable damping force shock absorber according to claim 9 installed at a wheel of an automobile, the control apparatus comprising:
a damping force sensor signal processing circuit for adjusting the magnitude of the output signal of the damping force sensor in accordance with the damping force setting state of the damping force adjusting mechanism; and
a control circuit for actuating the damping force adjusting mechanism to adjust the damping force of the shock absorber on the basis of the output signal signal of the processing circuit.

15. An adjustable damping force shock absorber according to claim 14 said control apparatus installed at a front wheel, wherein the damping force of the rear wheel shock absorber is controlled in response to the output signal of the damping force sensor of the front wheel shock absorber.

16. An adjustable damping force type shock absorber comprising:
a cylinder;
a piston slidably inserted in the cylinder so that an inner space of the cylinder is substantially separated into two chambers, said piston having a communicating path for communicating between the chambers;
a mechanism means for adjusting the damping force by changing a cross-sectional area of the communicating path; and
a damping force sensor made of a piezo-electric device, which is arranged at a predetermined position in a rod supporting the piston to receive a compressive or tractive force exerted along the direction of the axis of the rod via the piston when the piston slides within the cylinder to output an electric signal corresponding to the compressive or tractive force as a damping force signal.

17. An adjustable force type shock absorber installed at a wheel of an automobile, as set forth in claim 16 further comprising:
a damping force sensor signal processing circuit for adjusting the magnitude of the output signal of a damping force sensor in accordance with the damping force setting state of the damping force adjusting mechanism; and
a control circuit for actuating the damping force adjusting mechanism to adjust the damping force of the shock absorber on the basis of the output signal of the processing circuit.

* * * * *